United States Patent [19]

Schomberg et al.

[11] 4,065,808

[45] Dec. 27, 1977

[54] NETWORK COMPUTER SYSTEM

[75] Inventors: Hermann Schomberg, Tangstedt; Frank Heubach, Hamburg, both of Germany

[73] Assignee: U.S. Philips Corporation, New York, N.Y.

[21] Appl. No.: 649,556

[22] Filed: Jan. 15, 1976

[30] Foreign Application Priority Data

Jan. 25, 1975  Germany .............................. 2503087
June 16, 1975  Germany .............................. 2526811

[51] Int. Cl.² .............................................. G06F 7/38
[52] U.S. Cl. .............................................. 364/200
[58] Field of Search ............... 235/180; 340/172.5; 445/1; 364/200, 900

[56] References Cited

U.S. PATENT DOCUMENTS

| | | | |
|---|---|---|---|
| 3,287,703 | 11/1966 | Slotnick | 340/172.5 |
| 3,348,210 | 10/1967 | Ochsner | 340/172.5 |
| 3,473,160 | 10/1969 | Wahlstrom | 340/172.5 |
| 3,701,976 | 10/1972 | Shively | 340/172.5 |
| 3,815,095 | 6/1974 | Wester | 340/172.5 |
| 3,936,806 | 3/1976 | Batcher | 340/172.5 |

*Primary Examiner*—Harvey E. Springborn
*Attorney, Agent, or Firm*—Frank R. Trifari; Daniel R. McGlynn

[57] ABSTRACT

A network computer system in which the individual processors are arranged in the form of a matrix, with each processor connected with its directly neighboring processors. The individual processors are checkerboard-like assigned to one of two groups, and each group is connected, by its own instruction line, to a control unit for connection to the control computer. The system is useful in performing iterative calculations in which the processors of the one group calculate new values on the basis of initial data previously calculated by the directly adjacent respective processors of the other group.

3 Claims, 9 Drawing Figures

NETWORK COMPUTER SYSTEM

The invention relates to a computer system comprising a control computer and a plurality of processors of identical construction which are matrix-wise arranged, each processor being connected to the directly neighboring processors in the matrix via data exchange lines and to the control computer via instruction lines and signalling lines. The control computer is connected to at least some of the processors by data exchange lines.

Computer systems of this kind are known, for example, from IEEE Transactions on Computers, Vol. C 21 (1972), pages 948 – 960. Each processor therein comprises at least devices for some logic arithmetical combinations and also a given storage capacity. The program is supplied by a control computer which may be a normal large multi-purpose computer, and each instruction is applied in parallel form to all processors. All processors thus simultaneously perform the same operation, but the operands may differ from processor to processor. This type of network computer belongs to the category of "single instruction stream — multiple data stream" (SIMD) category. Each processor is connected to its neighbors, so that a local data exchange between the processors is possible and each processor can utilize data from the neighboring processors for a calculation step.

A network computer has been constructed which is known as the ILLIAC IV and which is described, for example, in IEEE Transactions on Computers, Vol. C-17 (1968), pages 746 – 757. Inhibit logic in this computer enables individual processors to be cut off from the common instructions stream in dependence of the data stored in the processors. Moreover, local indirect addressing is possible. These devices enable a deviation from the SIMD principle, so that the flexibility of the network computer is increased.

The said additional possibilities, however, result in a very complex construction of the processors and to a very complex control, Inter alia for cost considerations the number of processors, and hence the feasible parallelity, is restricted to 64 processors in the known computer.

However, there are data processing problem for which a larger number of processors is desirable. A problem of this kind is the numerical solution of partial differential equations by difference methods. A problem which is typical of this field is the solution of a linear equation system of given, very special structure. This is usually iteratively done. The separate iteration steps can in principle be performed in N-fold parallel, N being the number of unknown quantities and amounting of from $10^3$ to $10^4$. In that case N processors are required. The known network computers are not optimally suitable for solving this problem because, ignoring the insufficient number of processors, the SIMD principle allows only a N/2-fold parallelity for given iteration processes, so that the theoretically possible maximum speed is about halved. Furthermore, the complex control of the known network computer is superfluous.

The invention has for its object to provide a network computer for numerically solving partial differential equations by difference methods, which offers optimum use of the theoretically possible parallelity and whose processors and their control are still comparatively simple.

This object is achieved by the computer system according to the invention, designed for solving difference equations involving a number of unknown variables, i.e., the solution by numerical analysis of given types of partial differential equations. There is provided a processor for each unknown variable of the equation, the processors being checkerboard - like arranged in two groups and being connected for each group to the control computer via common instruction lines and signalling lines, so that each time a processor of the one group is directly neighbored only by processors of the other group, during the solving of the difference equations the two groups of processors each time alternately receiving corresponding and preferably at the same time generally non-corresponding instructions or series of instructions, i.e. looking at a certain time T1 the one group of processors (white for example) handle an instruction say I1 and another group of processors (black in this case) handle an instruction I2. Looking at a time thereafter T2 the one group of processors will handle the instruction I2 and the other group of processors will handle the instruction I1.

An elaboration of the computer system in accordance with the invention is characterized in that a control unit comprising a program store is connected between the control computer and the processor (i.e. element 2), two instruction decoders being connected to the program store in the control unit, each decoder feeding the instruction lines for one group of processors. It is also advantageous that the computer system in accordance with the invention comprises a buffer store which has a capacity for the information of a matrix edge row of processors and whereto this matrix edge row of processors is connected in parallel, the buffer store also being connected to the control computer. The buffer store is effectively constructed as a shift register which receives the information for a matrix edge row of processors in series form from the control computer and which applies this information to the control computer also in series form, and which supplies this information to or receives this information from the processors in parallel form. A further preferred embodiment of the computer system in accordance with the invention is characterized in that for the transfer of data between the further processors of the matrix and the buffer store, these data are step-wise transferred, under the control of an appropriate series of take-over instructions to all processors, from these further processors to the processors of the matrix edge row and subsequently to the buffer store, or vice versa. The said control unit preferably comprises a switching matrix which is controlled by the decoders and which controls the data or instruction paths between control computer, program store, buffer store and processors and also the instruction lines each time common to a group of processors and the corresponding decoder.

The said buffer store is preferably provided for successively transporting the coefficients and the initial value to each processor. Subsequently, the calculation is performed in accordance with the introduced program, and at the end of the program the results then stored in the individual processors must be read and transferred to the control computer before new data for a new calculation can be input. In accordance with the invention, this is effected by means of the said buffer store in that the result data are step-wise applied to the buffer store and then to the control computer. However, a substantial amount of time is then required for the data input as well as the data output; particularly in the case of large quantities of data and comparatively short processing programs or calculations a comparatively large amount of time is then required.

In order to reduce the time required for the input of data in and the output of data from the processors, a further preferred embodiment yet of the computer system in accordance with the invention is characterized in that a second buffer store, having the same capacity as the first buffer store, is connected to a second matrix edge row of processors which is situated opposite the first matrix edge row whereto the first buffer store is connected, only the first buffer store receiving input data from the control computer and only the second buffer store transferring output data to the control computer, in the case of input of new data from the first buffer store in parallel form to the processors of the first matrix edge row connected thereto and subsequently step-wise to the other processors, the data stored in the processors being at the same time step-wise transferred, by an appropriate series of take-over instructions, to the processors of the second matrix edge row and then in parallel form to the second buffer store.

The timing of the sytem is such that with the use of the second buffer store, the first buffer store is available only for input and the second buffer store is available only for output, so that input and output can be simultaneously effected Thus, only time for one of these operations is required, so that more time is available for the actual process steps.

Both buffer stores are preferably constructed as shift registers which perform a series/parallel conversion and a parallel/series conversion, respectively for the data exchange between the processors and the control computer. In order to realize the input and output at the same time as much as possible, the two buffer stores can be connected to the control computer via separate data lines. The processors of the first and the second matrix edge row can also be constructed only as a store, without including the more complex circuitry for data operations, so that the processors can perform process steps while a data transfer takes place between the buffer stores and the control computer. In this manner even more time is saved for the data transport, or even more time is available for the actual execution of the calculation.

Further aspects of the invention will become apparent from the following description of embodiments in accordance with the invention; this description is not intended to limit the scope of the invention in any way.

Figure 1:
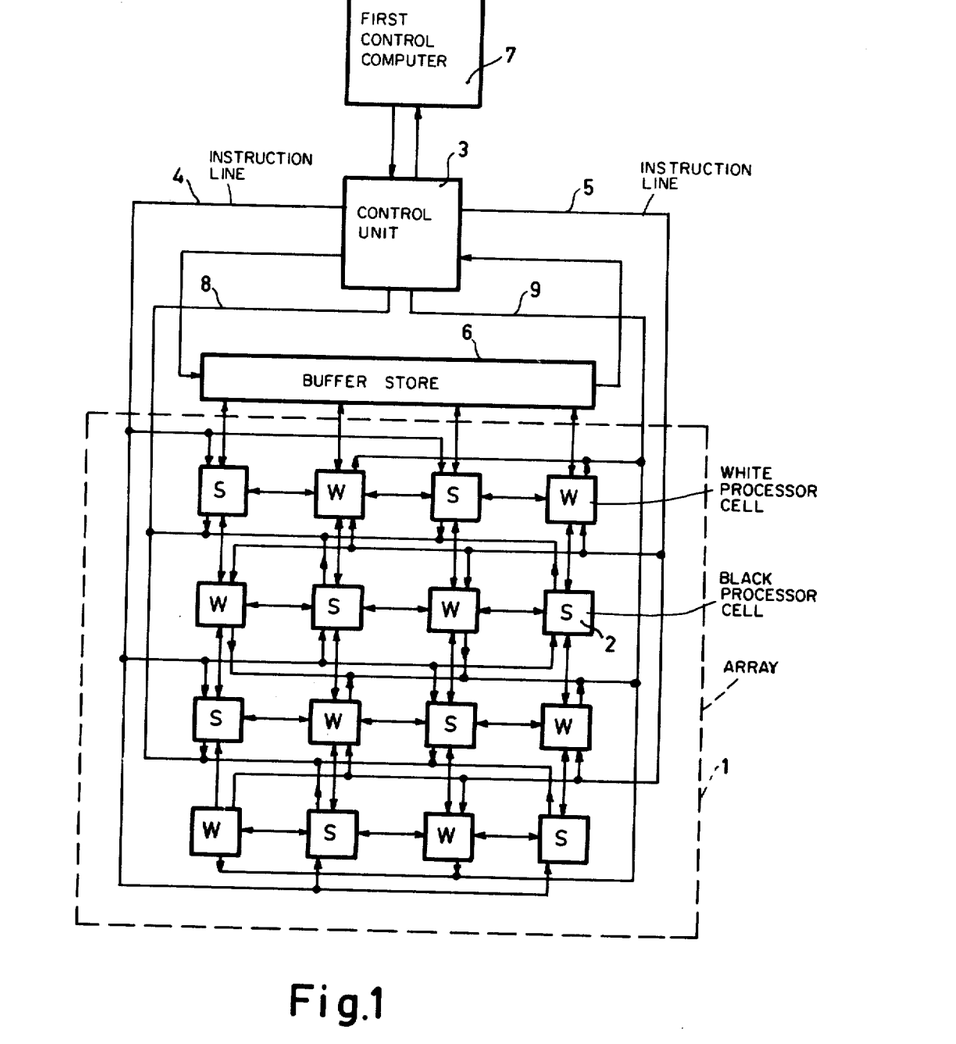
FIG. 1 is a simplified block diagram of the network computer system according to the present invention.

The computer system shown in FIG. 1 consists of a matrix-like array of 1 of separate processors 2, also referred to as cells, which are all of the same construction. These processors 2 are all assigned to one of two groups in a checkerboard-like manner, the said groups being referred to herein as "black" and "white" or "s" and "w" for short. In order to clarify this sub-division, the indication "s" or "w" of the groups is also included in the indication of the processors. It will be obvious that each black cell is surrounded only by white neighbors and that each white cell is surrounded only by black neighbors. The lines which extend between the cells and which are provided with arrows in two directions indicate that each cell has a data connection with its neighboring cells of different color.

The individual cells or processors 2 of the matrix array 1 are controlled by the control unit 3. To this end, an instruction line 4 extends from this control unit to a all black cells and an instruction line 5 to all white cells. Via these instruction lines, the black cells as well as the white cells receive each time in parallel form the same "black" and "white" instructions, respectively. Generally, the black and white instructions are different, but they may also be the same. Moreover, at given timing cycles it may occur that only one of the two instruction lines carries an instruction. The instruction lines also serve for the transport of general "black" or "white" operands or parameters. It will be obvious that each instruction is shown as a single line for the sake of simplicity, and that it actually consists of a plurality of parallel lines for the bit-parallel transport of an instruction word.

Each processor 2 generates at least one signalling signal which, in the present case of difference equations, serves as a convergence signal. These signalling signal are applied, via the signalling lines 8 and 9, to the control unit 3, each of the two signalling lines being connected to the signalling outputs of all processors of the same group. All outputs of the black cells are thus connected to the signalling line 8, while all output of the white cells are connected to the signalling line 9.

All processors 2 operate in synchronism, because the operation synchronism is controlled, via a common clock line (not shown), by a central device such as the control unit. The sub-division into two groups is not applicable in this respect.

The processors in the upper row of the matrix-like array are connected to a buffer store which serves as an intermediate store for the data exchange between the control computer 7, being a normal universal computer, such as the Philips P852M and the processors. This may run with a "linkage editor", i.e., software which provides the system with the facility to link separate object modules, so that the advantages of modular programming are available and achieved in this application. This buffer store is constructed as a shift register whose capacity, i.e. number of positions, is so large that the information for all processors of the upper matrix row can be simultaneously stored. The data exchange between this buffer store and the processors of the upper matrix row is effected completely in parallel, while the data transport between the buffer store 6 and the control computer 7 (via the control unit 3) may be bit-wise or word-sequential.

The control computer 7 not only supplies or stores the calculated data, but also generates control signals and initially contains the program. The connection between the control computer and the processors 2, including the buffer store 6, is established by the control unit 3 whose internal construction is shown in detail in FIG. 2.

Figure 2:
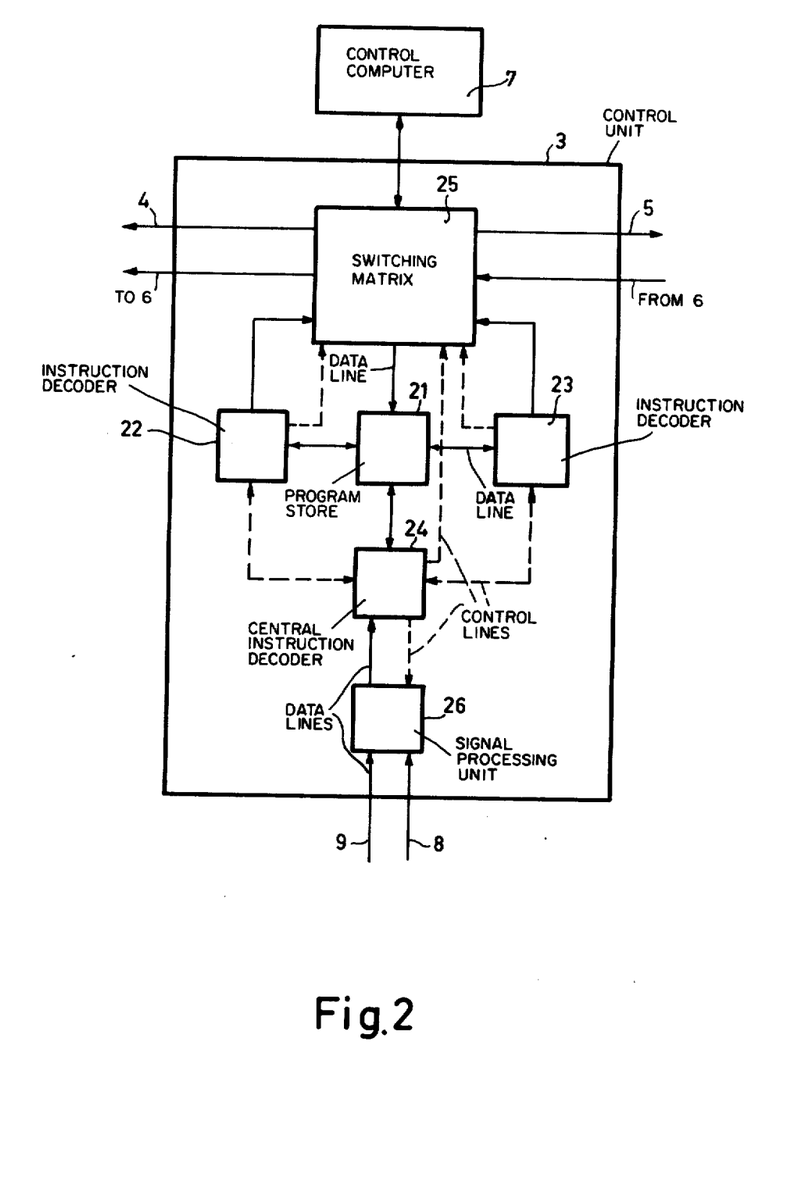
FIG. 2 shows a block diagram of the internal construction of the control unit.

The control unit comprises a program store 21 which generally contains all instructions required for completely solving an equation system. The program store has connected to it three instruction decoders 22, 23 and 24 which decode the instructions supplied by the program store; the instruction itself can select the decoder. The decoder 22 decodes the instructions to be applied to the black cells or processors via the instruction line 4, and the decoder 23 decodes the instructions for the instruction line 5 for the white cells. These decoders are connected, via a switching matrix 25, to the instruction lines 4 and 5, the said matrix being essentially controlled by the decoders and switching not only instruction paths but also data paths. The connection to the control computer, whereby data as well as commands are transported, also extends via this switching matrix 25. At the beginning of a calculation, the program is transferred from the control computer 7 to the program store 21 via the switching matrix 25. Subsequently, the control computer transfers the starting data, possibly via the same lines, via the switching matrix, to the buffer store and further to the processors. During the calculation, the decoders 22 and 23 generally simultaneously decode instructions which are applied to the instruction lines 4 and 5 via the switching matrix 25. At the end of the calculation, the broken lines between blocks represent control lines, while the solid lines represent data lines. The results are transferred from the processors to the control computer 7 via the buffer store and the switching matrix. The data transfer between buffer store and the processors of the upper matrix row is also effected via this switching matrix.

Figure 3:
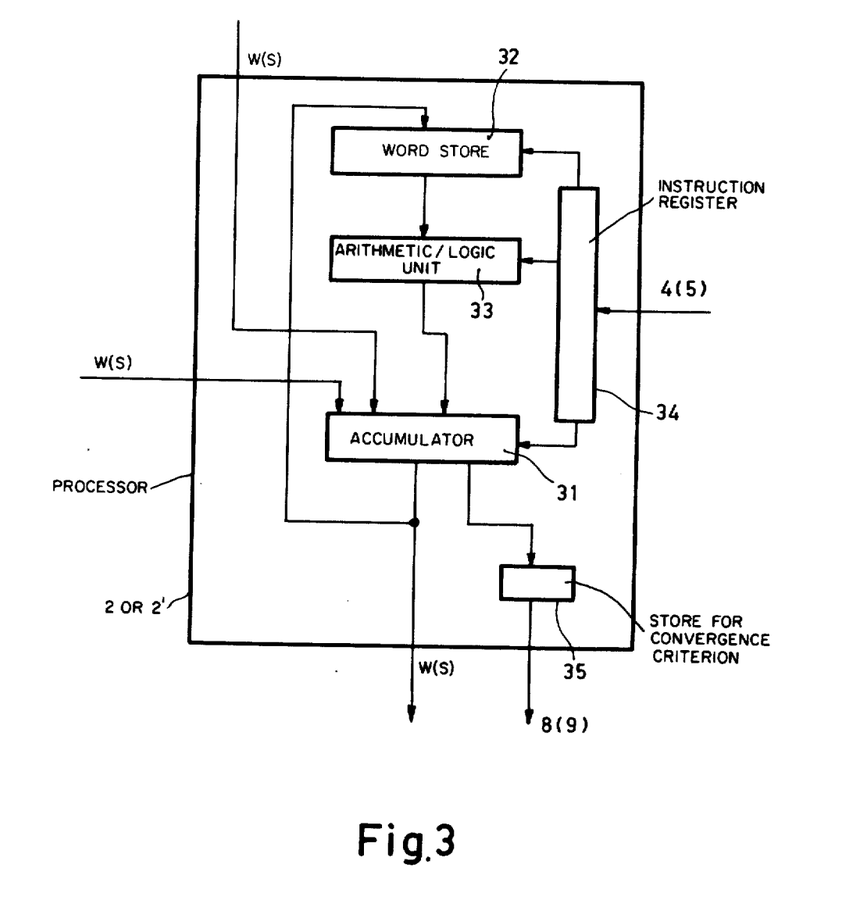
FIG. 3 shows the construction principle of a processor.

Each of the decoders 22 and 23 generally simultaneously decodes an instruction, which can often be the same for both decoders, or it may occur that only the third decoder 24, referred to herein as the central decoder, is in operation. This decoder controls the signal processing unit 26 wherein the convergence signals received from the processors via the signalling lines 8 and 9 are stored and combined, and also the data input and output for the buffer store. For the processors 2 use can be made of commercially available components which are known as microprocessors; however, because only comparatively simple functions are required, correspondingly cheap components can also be used. The construction principle of the required processors is diagrammatically shown in FIG. 3. There is provided an accumulator 31 whose output is fed out of the processor once so as to allow neighboring processors access to the data; on the other side, the accumulator is connected to a store 32 for a small number of words. There is also provided an arithmetic and logic unit 33, so that the processor can perform additions, subtractions, multiplications and possibly logic combinations. The accumulator furthermore has connected to it the outputs of the accumulators of the neighbouring processors; this is only diagrammatically denoted by two inputs. These lines can also be directly connected to the store 32. The individual components are controlled by the instruction register which governs the take-over of the data in the accumulator 31 or the store 32 as well as the combination to be performed in the unit 33. This instruction register 34 receives its information from the instruction line 4 or 5, each time in accordance with the group wherein the relevant processor is included. There is furthermore provided a store 35 for the convergence criterion, fed by the accumulator 31, which is connected to the signalling line 8 or 9 in accordance with the group wherein the relevant processor is included.

Figure 4:
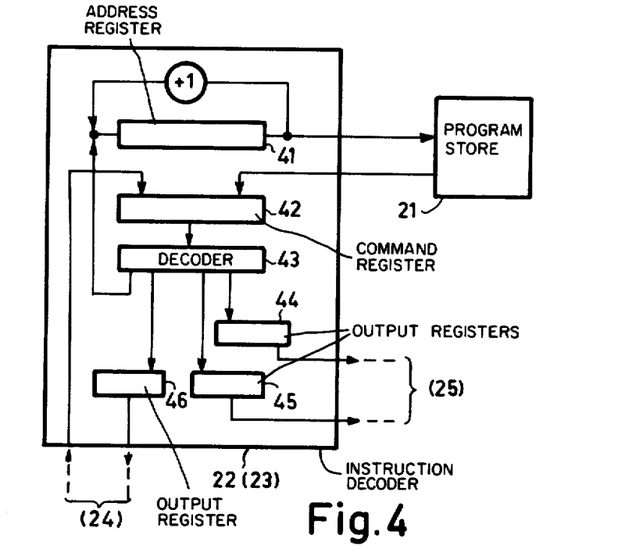
FIG. 4 shows a decoder used in the network computer system.

The decoders 22 or 23 as well as 24 can be constructed similar to the program control system of a normal all-purpose computer. FIG. 4 shows the construction of the instruction decoder 22 or 23 in more detail. There is provided an address register 41 which contains the address of the storage position to be addressed in the program store 21. The contents of the address register 41 can be continuously increased by one unit when a program sequence consisting of a plurality of individual commands is to be consecutively executed. However, it can also be set by the decoder 43 when a jump is to be performed in the program to be executed; this occurs particularly in the course of an iteration. The contents of the program store 21, i.e. the command read, are written in the command register 42 and are subsequently decoded in the decoder 43. However, a command can also be given by the central decoder 24; this command is then also written in the command register 42, for example, by way of an OR-combination on the input of the command register. This is efficient, for example, when in last instance the central decoder has been active and subsequently the decoder 22 or 23 must start to operate again. The decoder 43 determines whether the command concerns one of the output registers 44, 45 or 46 or the address register 41, and conducts the command information to the relevant register. The register 44 applies data to the switching matrix 25; they can then be transported, for example, to the buffer store or to the processors, as will be described hereinafter. The register 45 contains information for the control of the switching matrix 25, i.e. for establishing a data path in the switching matrix. The register 46 conducts information to the central decoder 24; the processing of this information will be treated in the description of the central processor with reference to FIG. 5. It is to be noted that the decoder 23 is constructed exactly as shown in FIG. 4.

Figure 5:
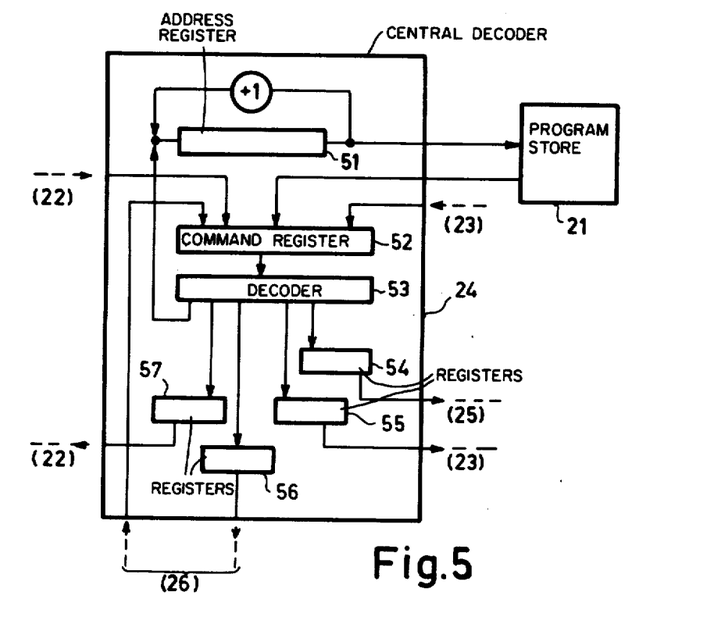
FIG. 5 shows a central decoder used in the system.

The central decoder 24 shown in FIG. 5 is of a construction quite similar to that of the decoder shown in FIG. 4. This decoder again comprises an address register 51 which controls the program store and whose contents can each time be increased by one step or erased by an output signal from the decoder 53. There is also provided a command register 52 which takes up the command read from the program store 21 or the information supplied by the decoders 22 and 23 or the signal generated by the convergence logic unit 26, that is to say, preferably again via an OR-combination on its input. The decoder 53 again determines for which of the registers 54 to 57 or the address register 51 the command is intended, and transfers the data of the command to the corresponding register. The outputs of the registers 55 and 57 are connected to the said inputs of the decoders 22 and 23, the output of the register 54 controls the switching matrix 25; and the output of the register 56 provides the interrogation for the convergence logic unit 26.

Because all three decoders 22 to 24 have access to the program store 21, it must be ensured by suitable conrol or interlocking that always only one access to the program store is granted at any time. This is achieved notably by the special set-up of the program in the program store 21.

Figure 6A:
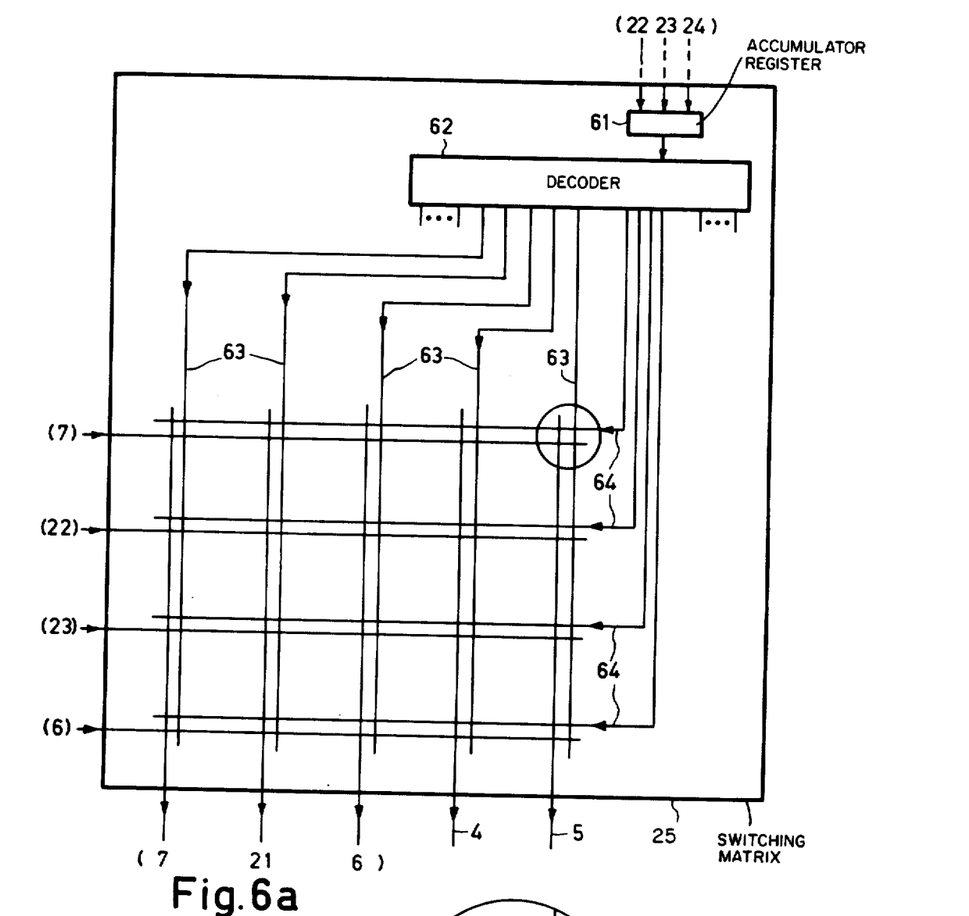
FIGS. 6a and 6b shows a switching matrix.
Figure 6B:
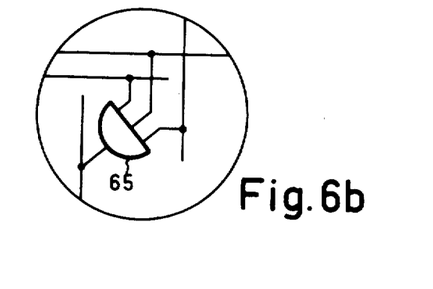

FIG. 6a shows an embodiment of a switching matrix in accordance with the crosspoint switch principle. The control inputs of the decoders 22, 23 and 24 are connected, via an accumulator register 61, to a decoder 62 which enables, in accordance with the control information, one of the column lines 63 and simultaneously one of the row lines 64, so that at the crosspoint of this column and row circuit one of the information input lines is connected to one of the information output lines. To this end, each crosspoint can include an AND-member comrprising three inputs (as is shown in IFG. 6b), two inputs thereof being connected to a column line and a row line which prepare the AND-member, while the third input is connected to the associated information input line, the output being connected to the information output line. Each information input line and output line can also consist of a plurality of parallel lines, in which case there are a plurality of AND-members 65 per crosspoint of the switching matrix. Preferably there are provided a number of such crosspoint distributors, which have the information input lines and output lines in common, but which are driven independently by the decoder 62, so that a plurality of different paths can be simultaneously established.

Figure 7:
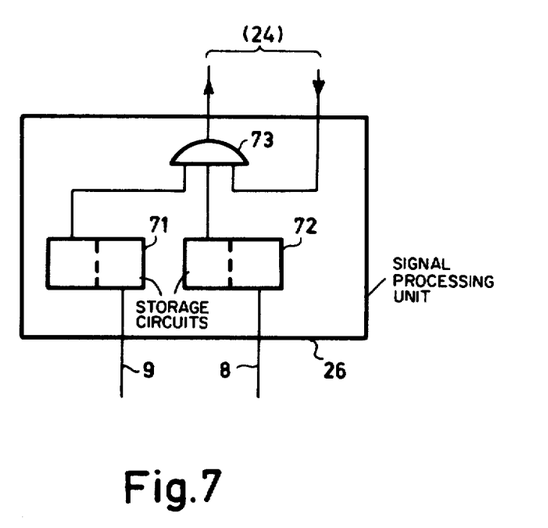
FIG. 7 shows a convergence logic unit.

The signal processing unit 26 is shown in FIG. 7 and essentially comprises two storage circuits 71 and 72 which may be, for example, flipflops and which are driven by the signalling lines 8 and 9. These storage circuits are required in view of the alternating operation of the two groups of processors. The outputs of the two storage circuits 71 and 72 are combined via the AND-member 73, which also has connected to it an interrogation line from the central decoder 24; the output of this member is connected to this central decoder in the already described manner. It is only when both groups of processors simultaneously satisfy the convergence criterion, i.e. when no signal is generated on any of the signalling lines 8 and 9, in the present case, that the AND-member 73 supplies an output signal when interrogated, thus terminating the iteration.

The operation of the described network computer system will now be described on the basis of a practical example. The partial differential equation $$(au_x)_x + (cu_y)_y + fu = g$$

with the boundary condition $u = h$
must be solved. A variable as a subscript denotes partial differentation with respect to that variable. It is assumed that the functions $a, c, f, g, h$ are sufficiently smooth (i.e. continuous and differentiable) and that there is non-trivial solution $u$ to the problem.

A problem of this kind occurs, for example, when the temperature distribution of a plate which is to be kept at a constant temperature at its edges is to be calculated. For solving this problem, the plate is covered by a grid, and the partial differential equation is then converted into a system of difference equations of the following kind:

$$-u_{i,k} - L_{ik}u_{i-1,k} - R_{ik}u_{i+1,k} - T_{ik}u_{i,k+1} - B_{ik}u_{i,k-1} = G_{ik}$$

such an equation existing for each grid point $ij$. The coefficients $L_{ij}, R_{ij}, T_{ij}, B_{ij}, G_{ij}$ result from the relevant functions $a$ to $g$ at the corresponding grid points and also from the distance from the each time neighboring grid points which must not be uniform access the grid.

Subsequently, the various functions and the grid distances are input into the control computer 7 and the coefficients for all grid points are calculated. The program for performing the iteration is then transferred by the control unit 3 from the control computer 7, via the switching matrix 25, to the program store 21 in as far as this program is not already present in the program store. The following functions are then performed by this input program.

In the described example, first five coefficients $L_{ij}, R_{ij}, T_{ij}, B_{ij}, G_{ij}$ are applied to each processor or cell $c_{ij}$, and also an initial status $Z_{ij}$, $c_{ij}$ denotes the cell in the $i^{th}$ row and the $j^{th}$ column of the matrix-like array. For transferring these data, first the bufffer store 6 is serially filled by the control computer 7 via the switching matrix 25. Subsequently, an instruction is transferred via both instruction lines 4 and 5 simultaneously; this instruction ensures that all cells take over the contents of the accumulator of their upper neighbor. Due to the repeated filling of the buffer store 6 and the subsequent transfer of the contents of the accumulator of each time the upper neighboring processor, the accumulators of all processors are successively filled in the order from the top to the bottom. Each processor 2 transfers the contents of its accumulator 31 to its store 32. The said coefficients are thus stored in the associated cell $c_{ij}$, i.e. first all $L_{ij}$, then all $R_{ij}$ etc.; these coefficients must be input in the buffer store only in the corresponding order. For the described arithmetic problem further data are required; i.e. the relaxation parameters $\omega_1{}^s, \omega_1{}^w, \omega_2{}^s, \omega_2{}^2 \ldots$, that is to say a different pair of parameters for each iteration step. These parameters are also supplied by the control computer 7, and can be fetched accordingly after each iteration step. However, it is more efficient to write these parameters in the buffer store 6 in the corresponding order after the input of all coefficients; however, they should not be applied to the processors of the upper matrix row. During the input, the third decoder 24 (the central decoder) controls the filling and emptying of the buffer, while the first two decoders 22 and 23 decode the instructions which control the taking over of the data from each time the accumulator of the upper neighbor. In this case the two decoders decode the same instruction.

Subsequently, the iteration part of the program commences. Each iteration step consists of two half-steps. Dring the first half-step of the $k^{th}$ iteration step, all black cells calculate in accordance with the condition $$Z_{ij} \leftarrow Z_{ij} + \omega_k{}^s [L_{ij}Z_{(i-1)j} + R_{ij}Z_{(i+1)j} + T_{ij}Z_{i(j+1)} + B_{ij}Z_{i(j-1)} - Z_{ij} + G_{ij}]$$

a new status on the basis of their own status and the status of the white neighbouring cells, while all white cells test the convergence criterion $$|Z_{ij} - L_{ij}Z_{(i-1)j} - R_{ij}Z_{(i+1)j} - T_{ij}Z_{i(j+1)} - B_{ij}Z_{i(j-1)} - G_{ij}| - \epsilon < 0$$

and apply the result in the form of a signalling signal, via the signalling lines 8 and 9, to the processing unit 26 of the control unit 3. During the subsequent second half-step, all white cells calculate a new status on the basis of their own status and the status of the neighboring white cells in compliance with the above condition, but now the correspondingly different parameter $\omega_k{}^w$ of this $k^{th}$ iteration step is applied. Simultaneously, all black cells test the indicated convergence criterion, the signal the result to the control unit 3 via the signalling line 8. As has already been described, the parameters are effectively applied to the buffer store 6 in the correct order, so that the required parameter appears exactly on the series output of the buffer store, wherefrom it proceeds, via the switching matrix 25 and the corresponding instruction line 4 or 5, to all cells of this group. The tolerance threshold $\epsilon$ for the convergence criterion, being constant for all iteration steps, is present in the program store 21 and is also applied to the cells via the instruction line 4 or 5.

For the testing of the convergence criterion, the sign of the left side of the given equation is preferably used, in that the bit indicating this sign is applied to the control unit 3 via the corresponding signalling line 8 or 9. Particularly in view of the large number of processors, each time connected to one signalling line, it may be advantageous to pass the signalling line consecutively through the processors, and to combine, by means of logic gates, the sign bit just calculated with the input convergence line to form a new convergence bit which is applied to the next processor and which is finally applied from the last processor to the control unit.

The individual iteration steps with the alternating first and second half-steps continue until the processing unit 26, controlled by the central decoder 24, indicates by way of its convergence logic system, that convergence has occurred in two successive half-steps. In this case the last status values of all processors, which may still be stored in the accumulators thereof, represent the pursued solution, and the iteration has been completed. The transfer of the status values to the control computer is stepwise effected, in the opposite order in comparison with the input, from all processors in the upwards direction via the buffer store 6 and the switching matrix 25 in the control unit 3.

The shape of the matrix-like array shown in FIG. 1 is not further defined. An approximately quadratic array will be effective in many cases, because it is the best compromise between the electronic requirements and the time requirements for the data input. For many applications, however, other designs can also be effective. In an extreme case, the matrix can even consist of only one row which is connected parallel to the buffer store, so that a very large bufer store is required, but the input and output of data will then be very fast. In another extreme case, the matrix consists of only one column; only the upper processor is then connected to the buffer store, and all data to be written in or read from this column must be consecutively transported via this upper processor.

A further elaboration consists in a three-dimensional matrix. The individual processors in each plane are then assigned to the two groups in a checker-board-like manner, and this arrangement changes from plane to plane for each matrix point of the plane. Like for the one-dimensional matrix, the principle of the invention is thus maintained, i.e. each processor is adjoined only by processors of the other group. All processors of a group, regardless of the plane in which they are situated, are also connected to the instruction line and the signalling line assigned to this group. In the case of a three-dimensional matrix, the buffer store can be designed and connected to the matrix so that all processors in a surface of the matrix receive or supply data in parallel form, so that the buffer store has a two-dimensional design, but a purely serial input or output can then still be present. A further possibility consists in the connection of only one side of the matrix to a one-dimensional buffer store, as described in the above example, followed by the continued input or output, in the described manner, of data to or from the processors in one plane in one direction; subsequently, during a transport step data can be applied to the next plane in the direction perpendicular to the former direction, and after that the processors in the upper plane of the matrix series can be filled or emptied again etc. The input of data then requires more time, but only a smaller buffer store is then required.

Finally, it is also possible to make one processor calculate a fixed number of unknown quantities rather than to provide a processor for each unknown quantity of the difference equation system. Each step of the iteration process then consists of a larger number of individual calculation steps; particularly, each processor must then be capable of storing a larger number of coefficients, i.e. generally several coefficients for each unknown quantity. The duration of the complete iteration is then accordingly longer, but only a fraction of the processors required in the described embodiment will thus be required. The principle that all processors, thanks to the assignment to two groups, alternately perform an iteration calculation and a convergence calculation so that they are optimally used, is then maintained.

Figure 8:
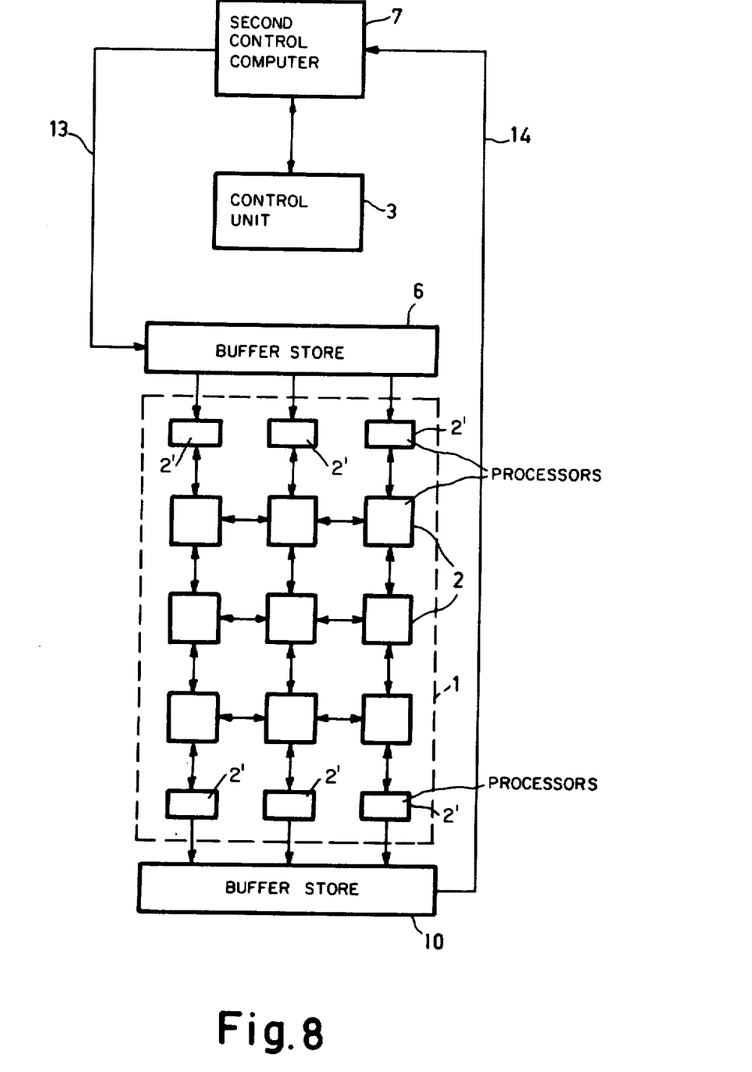
FIG. 8 shows the network computer system comprising two buffer stores.

As has already been stated in the preamble, in a further preferred embodiment of the invention the time required for data input in and output from the processors can be reduced by connecting a second buffer store, having the same capacity as the first buffer store, to a second matrix edge row of processors. This arrangement is shown in FIG. 8. Besides the buffer store 6, connected to the upper matrix edge row, there is provided a second buffer store 10 which is connected to the lower matrix edge row. The data lines 13 and 14 of the two buffer stores are directly connected to the control computer 7, again a Philips P852M, (the use of the prime in FIG. 8 indicates that the computer in FIG. 8 is not in the same mode of operation as computer 7 in FIG. 1), i.e. they no longer extend via the control unit 3. As is indicated by the references of the data lines, output data from the control computer are applied to the buffer store 6 only via the data line 13, the said buffer therefore being referred to as the input buffer, because it contains the data to be input in the processors of the matrix array 1. Similarly, data are applied from the array 1 to the control computer only via the data line 14 from the buffer store 10, which will therefore be referred to hereinafter as the output buffer. The transport from the data line 13 itself to the input buffer and the output of data from the output buffer to the data line 14 itself can be supervised by control lines (not shown) of the control unit 3.

In order to clarify the function, it is assumed that the processors 2 in the matrix 1 have just completed a complete calculation, i.e. solving a system of different equations, and that a new calculation with different data must be started. To this end, the result data still present in the processors must be transferred to the control computer 7, and subsequently the new data must be transferred from the control computer to the processors. The program in the control unit 3 then applies instructions to all processors 2 as well as to the processors 2' (the 2' processors are the same type of processors as 2, and the prime is used to merely designate the location on the upper or lower mtrix edge), of the two matrix edge rows, with the result that the total data contents of all processors are step-wise shiften downwards in parallel form. After each instruction of this kind, the output buffer 10 receives the data contained in the processors 2' of the lower matrix edge row in parallel form, and shifts these data in series form to the control computer via the data line 14, it being assumed that the output buffer 10 is a shift register. Simultaneously, after each instruction step the processors 2' of the upper matrix edge row are vacated and they take over the contents of the input buffer 6 in parallel form. Thus, when the data of the output buffer 10 are being transferred to the control computer 7 via the data line 14, the new information is simultaneously transferred from the control computer to the input buffer 6 via the data line 13. Subsequently, the control unit 3 again applies an instruction to all processors 2 or 2', with the result that the complete data contents are shifted one step downwards, and the whole process is repeated.

The processors 2' in the upper and lower matrix edge row, directly connected to the input buffer 6 and the output buffer 10, respectively, have only a storage function in the embodiment show, and not an arithmetical or combinatory function. As a result, the input buffer 6 can take over and shift further new information on its input, and the output buffer 10 can shift its contents further and supply it on its output, while the processors 2 at the same time complete processing operations, because the data in the processors 2'10 are meanwhile sustained.

What is claimed is:

1. A multiprocessor computer system comprising:
   a control computer and a control unit connected thereto;
   first and second groups of identical processors arranged in a matrix array, each of said processors of one group lying directly adjacent to at least two of said processors of the other group and connected to said adjacent processors by means of data exchange lines; each group of said processors being separately connected to said control unit by instruction lines and signalling lines for transmitting non-corresponding instructions from said control computer to each group of processors; and
   a buffer store connected to said control unit by data lines and connected to at least some of said processors for storing information for processing by said at least some of said processors.

2. A computer system as claimed in claim 1, wherein said control unit is connected between said control computer and said processors, said control unit comprising a program store and two instruction decoders connected to said program store, each of said decoders feeding said instruction lines for an individual one of said groups of processors.

3. A computer system as claimed in claim 2, wherein said control unit comprises a switching matrix controlled by said decoders for controlling the data and instruction paths between the control computer and said processors.

* * * * *